US012651978B2

(12) United States Patent
Yang et al.

(10) Patent No.: US 12,651,978 B2
(45) Date of Patent: Jun. 9, 2026

(54) INTEGRATED AUXILIARY POWER SUPPLY WITH STABLE OUTPUT AT HIGH-LINE AND LIGHT-LOAD CONDITIONS

(71) Applicant: Murata Manufacturing Co., Ltd., Nagaokakyo (JP)

(72) Inventors: Zhihua Yang, Markham (CA); Ahmed Abdalla, Markham (CA); Anil Yaramasu, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 198 days.

(21) Appl. No.: 18/294,665

(22) PCT Filed: Aug. 3, 2022

(86) PCT No.: PCT/US2022/039240

§ 371 (c)(1),
(2) Date: Feb. 2, 2024

(87) PCT Pub. No.: WO2023/014763

PCT Pub. Date: Feb. 9, 2023

(65) Prior Publication Data

US 2024/0339940 A1 Oct. 10, 2024

Related U.S. Application Data

(60) Provisional application No. 63/228,855, filed on Aug. 3, 2021.

(51) Int. Cl.
*H02M 7/797* (2006.01)
*H02M 1/42* (2007.01)
*H02M 3/158* (2006.01)

(52) U.S. Cl.
CPC ......... *H02M 7/797* (2013.01); *H02M 1/4208* (2013.01); *H02M 3/1582* (2013.01)

(58) Field of Classification Search
CPC ... H02M 7/797; H02M 1/4208; H02M 3/1582
See application file for complete search history.

(56) References Cited

U.S. PATENT DOCUMENTS 7,164,591 B2 * 1/2007 Soldano ................ H02M 7/219 363/89
7,423,386 B2 * 9/2008 Radzinski ........... H02M 1/4225 315/307
8,222,872 B1 7/2012 Melanson et al.
9,590,494 B1 3/2017 Zhou et al.
10,205,398 B2 2/2019 Jitaru
(Continued)

FOREIGN PATENT DOCUMENTS

EP 2 339 727 A1 6/2011

OTHER PUBLICATIONS

Official Communication issued in International Patent Application No. PCT/US2022/039240, mailed on Nov. 28, 2022.

*Primary Examiner* — Adolf D Berhane
(74) *Attorney, Agent, or Firm* — Keating & Bennett, LLP

(57) ABSTRACT

A converter includes a first inductor, a first power switch connected to the first inductor, and an auxiliary power supply coupled to the first inductor to provide an auxiliary voltage from bi-directional current flow in the first inductor. In response to negative current flowing in the first inductor, a duty cycle of the first power switch is increased.

21 Claims, 9 Drawing Sheets

(56) References Cited

U.S. PATENT DOCUMENTS

| | | | | |
|---|---|---|---|---|
| 10,361,625 | B2 * | 7/2019 | Hwang | H02M 1/4266 |
| 2004/0264214 | A1 | 12/2004 | Xu et al. | |
| 2006/0208711 | A1 | 9/2006 | Soldano et al. | |
| 2011/0075462 | A1 * | 3/2011 | Wildash | H02M 1/0085 363/127 |
| 2012/0069615 | A1 | 3/2012 | Tomioka | |

* cited by examiner

INTEGRATED AUXILIARY POWER SUPPLY WITH STABLE OUTPUT AT HIGH-LINE AND LIGHT-LOAD CONDITIONS

BACKGROUND OF THE INVENTION

1. Field of the Invention

The present invention relates to electrical power converters. More specifically, the present invention relates to AC-DC converters with integrated auxiliary power supplies.

2. Description of the Related Art

Power density and cost are critical factors in the design of power supplies, particularly in view of increased energy demands. Power-supply design has focused on providing increased power in smaller packages and at reduced cost. Many known power supplies include a main power supply and an auxiliary power supply, in which the auxiliary power supply takes up a significant volume in the known power supplies. Extensive research has been done to eliminate the auxiliary power supply by utilizing magnetics of the main power supply, i.e., by implementing an integrated auxiliary power supply. However, integrated auxiliary power supplies typically provide deteriorated performance at high-line and light-load conditions, which has limited the widespread implementation of integrated solutions.

In known front-end AC-DC power supplies, a boost inductor can be used in place of a separate auxiliary transformer. Switching voltages on the boost inductor can be reflected to a low-voltage side of the power supply by wrapping several windings around the boost inductor. The reflected voltages can be rectified to generate different voltages to operate the power supply.

This approach of wrapping several windings around the boost inductor to provide power to the auxiliary power supply can fail in a condition of high-line input and light load on a main output of the power supply. The rectified voltages from the auxiliary power supply collapse, i.e., drop to a very low value (for example, substantially zero), as the boost inductor current becomes discontinuous, i.e., the inductor current becomes zero for a portion of the switching cycle. The duty cycle of the boost converter is very small because very little power is required to maintain a main DC bus at a predetermined voltage. Therefore, the switching voltages appear across the boost inductor for a very small duration of a pulse width modulation (PWM) period. The remaining duration of the PWM period includes a resonance between junction capacitor(s) and the boost inductor, which delivers substantially zero power. The converter can also enter burst mode when the main output is very close to no-load conditions. Accordingly, when no power flows from the input side to the secondary side of the auxiliary transformer, the output voltage of the auxiliary power supply can collapse (i.e., decrease to a very low level) because there is no continuous power flow to maintain the auxiliary output voltage at the desired voltage level.

FIG. 1 shows a circuit diagram 100 of a known unidirectional power factor correction (PFC) boost converter 110 with an integrated auxiliary power supply 120. The unidirectional PFC boost converter 110 includes a boost stage with a boost inductor L and a switch $S_1$. The control terminal of the switch $S_1$ receives a control signal from an external controller or the like. The unidirectional PFC boost converter 110 further includes a diode $D_3$ to provide unidirectional current flow between the AC voltage $V_{AC\_RECT}$ to the DC voltage $V_{DC}$. That is, by including a diode $D_3$ in the unidirectional PFC boost converter 110, current can only flow from the AC side to the DC side, i.e., from the AC voltage $V_{AC\_RECT}$ to the DC voltage $V_{DC}$. The unidirectional PFC boost converter 110 also includes a capacitor $C_{DC}$ across the DC voltage $V_{DC}$. The capacitor $C_{DC}$ operates as a buffer for power flow by filtering a second order harmonic generated by instantaneous power transmission to the DC voltage $V_{DC}$. In addition, the capacitor $C_{DC}$ filters ripple currents in the unidirectional PFC boost converter 110 and can provide energy to the unidirectional PFC boost converter 110 during a hold-up time.

The integrated auxiliary power supply 120 includes inductor $L_{aux}$. The inductor $L_{aux}$ is coupled to the boost inductor L to define a transformer. The integrated auxiliary power supply further includes diodes $D_1$ and $D_2$, rectifying capacitors $C_{rec1}$ and $C_{rec2}$, and a standby capacitor $C_{stby}$. The diodes $D_1$ and $D_2$ rectify the voltage provided by the secondary winding $L_{AUX}$, and the standby capacitor $C_{stby}$ is a bulk capacitor that provides filtering and helps maintain a stable output voltage at the DC voltage $V_{DC}$. A voltage $V_{stby}$ across the standby capacitor $C_{stby}$ is dependent upon a load connected to the unidirectional PFC boost converter 110. The output load of the auxiliary power supply 120 can be connected across the rectified voltage provided from the secondary winding $L_{AUX}$.

FIG. 2 shows voltage waveform $V_L$ and current waveform $I_L$ of the boost inductor L and voltage waveforms $V_{rec1}$ and $V_{rec2}$ of the rectifying capacitors $C_{rec1}$ and $C_{rec2}$ shown in FIG. 1 at high-line input and light load for two switching cycles. An example of a high-line input is greater than about 220 V, and an example of light load is less than about 10% of a rated load. When current $I_L$ through the boost inductor L is positive, a reflected voltage is induced on the inductor $L_{aux}$, and power flows to the output of the auxiliary power supply 120 from the input line (AC voltage $V_{AC\_RECT}$). When the current $I_L$ through the boost inductor L reaches zero at time T2, junction capacitances (for example, the junction capacitance between the drain and source of the switch $S_1$) begin resonating with the boost inductor L, and diodes D1 and D2 are reverse biased. The power flow to the output of the auxiliary power supply 120 from the input line (AC voltage $V_{AC\_RECT}$) is stopped for the duration from time T2 to time T3, and the load is supplied entirely by the rectifying capacitors $C_{rec1}$ and $C_{rec2}$ and the standby capacitor $C_{stby}$. Accordingly, the standby voltage $V_{stby}$ falls substantially, especially when a relatively high load is connected to the auxiliary supply.

SUMMARY OF THE INVENTION

Preferred embodiments of the present invention provide power converters with integrated auxiliary power supplies that can maintain a stable auxiliary output voltage at high-line, i.e., high input voltage, and light-load, i.e., low output power, conditions by allowing bi-directional current flow and that can achieve a reduction of size compared to power converters that include a separate auxiliary power supply.

A converter according to a preferred embodiment of the present invention includes a first inductor, a first power switch connected to the first inductor, and an auxiliary power supply coupled to the first inductor to provide an auxiliary voltage from bi-directional current flow in the first inductor. In response to negative current flowing in the first inductor, a duty cycle of the first power switch is increased.

The converter can further include an output capacitor, and the negative current may be provided by the output capacitor. The converter can further include no discrete diodes between the first inductor and the output capacitor.

The negative current can flow in the first inductor under high-line and light-load conditions. The auxiliary power supply can include a second inductor coupled to the first inductor to provide the auxiliary voltage, and the auxiliary power supply can include a third inductor coupled to the first inductor to provide a second auxiliary voltage.

The converter can further include a second power switch connected in series with the first power switch. A first node between the first and the second power switches can be connected to the first inductor, and the converter can define a totem-pole power-factor-correction (PFC) boost converter. The converter can further include first and second synchronous rectifiers connected in series with each other and connected in parallel with the first and the second power switches. The first and the second synchronous rectifiers can be field-effect transistors. The output capacitor can be connected in parallel with the first and the second synchronous rectifiers. The first and the second power switches can be GaN high-electron-mobility transistors, silicon carbide metal-oxide-semiconductor field-effect transistors, or insulated-gate bipolar transistors with anti-parallel diodes.

The converter can further include a synchronous rectifier connected between the first inductor and an output terminal of the converter, and the converter can define a synchronous boost converter.

The converter can further include a synchronous rectifier. The first power switch can be connected between a first input terminal of the converter and the first inductor, the synchronous rectifier can be connected between a second input terminal of the converter and a node between the first power switch and the first inductor, and the converter can define a synchronous buck converter.

The auxiliary power supply can include a second inductor coupled to the first inductor, a first capacitor and a second capacitor that can be connected in series with each other such that a node between the first and the second capacitors can be connected to a first terminal of the second inductor, and a first diode and a second diode that can be connected in series with each other such that a node between the first and second diodes can be connected to a second terminal of the second inductor. The first and second capacitors can be collectively connected in parallel with the first and second diodes.

A totem-pole power-factor-correction (PFC) boost converter according to a preferred embodiment of the present invention includes a first phase including a first boost inductor, a second phase including a second boost inductor, and an auxiliary power supply coupled to the first boost inductor. The first phase is operated as a boost converter to provide a DC output voltage, and the second phase is operated as a buck converter to provide a circulating current to the first boost inductor.

The second phase can be operated as the buck converter to provide the circulating current to the first boost inductor only under light-load conditions.

The first phase can include first and second boost switches connected in series, a first node between the first and the second boost switches can be connected to the first boost inductor, the second phase can include third and fourth boost switches connected in series, and a second node between the third and the fourth boost switches can be connected to the second boost inductor. The totem-pole PFC boost converter can further include first and second synchronous rectifiers that can be connected in series with each other, can be connected in parallel with the first and the second boost switches, and can be connected in parallel with the third and the fourth boost switches. The first and the second synchronous rectifiers can be field-effect transistors. An output capacitor can be connected in parallel with the first and the second synchronous rectifiers.

The first, the second, the third, and the fourth boost switches can be GaN high-electron-mobility transistors, silicon carbide metal-oxide-semiconductor field-effect transistors, and insulated-gate bipolar transistors with anti-parallel diodes.

The auxiliary power supply can include a third inductor coupled to the first boost inductor, a first capacitor and a second capacitor that can be connected in series with each other such that a node between the first and the second rectifying capacitors can be connected to a first terminal of the third inductor, a first diode and a second diode that can be connected in series with each other such that a node between the first and the second diodes can be connected to a second terminal of the third inductor, and a standby capacitor that can be connected in parallel with the first and the second capacitors. The first and second capacitors can be collectively connected in parallel with the first and second diodes.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention include converters each including an inductor, a power switch connected to the inductor to control current in the inductor, and an auxiliary power supply coupled to the inductor. The converter can be any suitable converter, including, for example, a totem-pole PFC boost converter, an interleaved totem-pole PFC boost converter, a synchronous boost converter, and a synchronous buck converter as discussed below. The auxiliary power supply can be any suitable power supply that can be coupled to the inductor. Under certain operating conditions, e.g., high-line and light-load conditions, in which the duty cycle of the power switch is small, the converter can be operated to allow negative current to flow through the inductor to ensure a stable auxiliary output voltage. The converter can include an output capacitor that provides the negative current to the inductor. To ensure that the negative current can flow from the capacitor to the inductor, no separate discrete diodes are included between the capacitor and the inductor. Instead of diodes, synchronous rectifiers can be used to allow the negative current to flow into the inductor. To compensate for the negative current provided by the output capacitor, the duty cycle of the power switch can be increased, which increases the power-delivery duration. The duty cycle can be increased in the switching cycle after the switching cycle that includes the negative current. In some applications, the duty cycle can be increased in more than one switching cycle to compensate for the negative current. The magnitude of the negative current depends on the load and the efficiency of the converter. When the AC input voltage of the converter approaches zero, the power switch cannot be kept on for a long time because doing so can cause a negative-current spike. How much the duty cycle is increased can be determined in any suitable manner. For example, a look-up table can be used that provides how much the duty cycle is to be increased based on, for example, the magnitude of the negative current and the AC input voltage, or a predetermined algorithm or model with respect to the magnitude of the negative current can be used to calculate how much the duty cycle should be increased.

Figure 3:
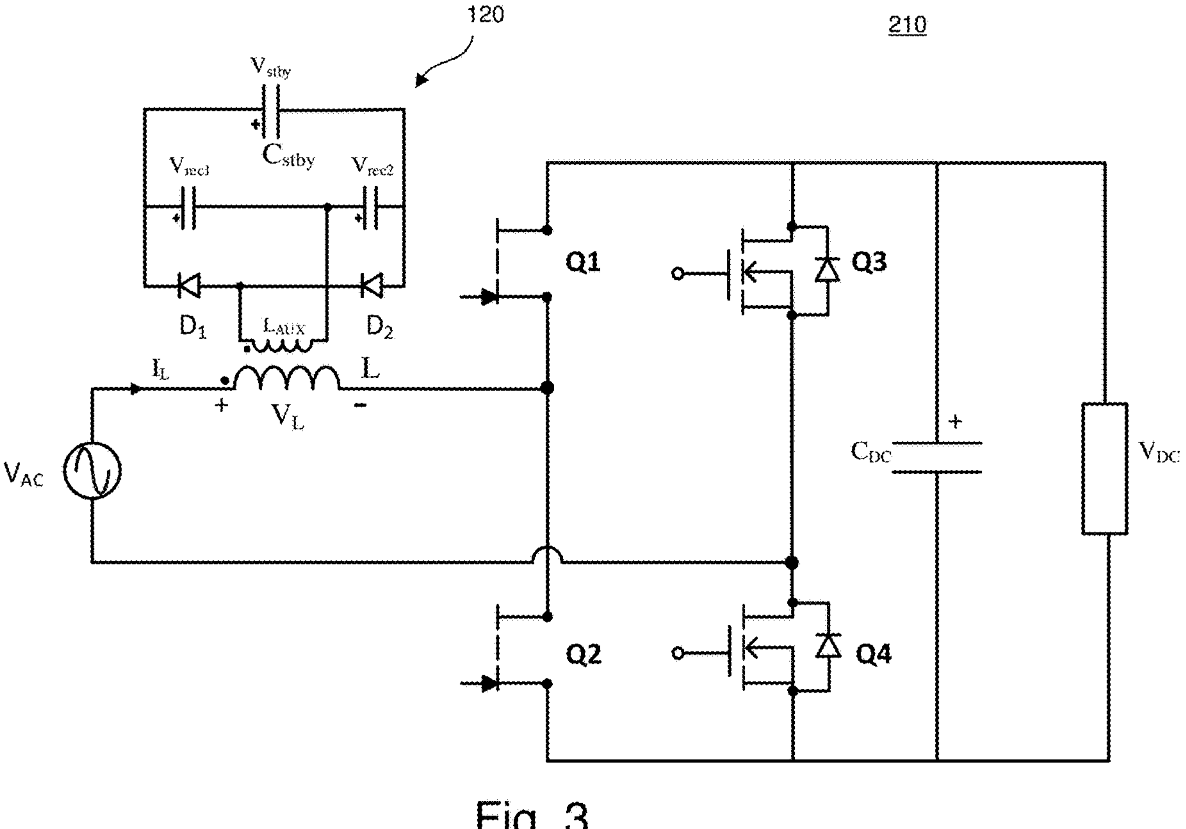
FIG. 3 shows a totem-pole PFC boost converter that can be operated in fixed-frequency mode.

FIG. 3 shows a totem-pole PFC boost converter 210 according to a first preferred embodiment of the present invention. The totem-pole PFC boost converter 210 includes an AC voltage $V_{AC}$ as an input voltage connected to inductor L (also referred to as the boost inductor), an integrated auxiliary power supply 120 coupled to the inductor L, two series-connected boost switches $Q_1$ and $Q_2$, which can also be referred to as power switches, connected to the inductor L, two series-connected synchronous rectifiers $Q_3$ and $Q_4$ connected in parallel with the boost switches $Q_1$ and $Q_2$, and an output capacitor $C_{DC}$ connected in parallel with the synchronous rectifiers $Q_3$ and $Q_4$. The output capacitor $C_{DC}$ can be connected to a load, shown as DC voltage $V_{DC}$ as the output voltage. A first node between the boost switches $Q_1$ and $Q_2$ is connected to a first terminal of the AC voltage $V_{AC}$ via the inductor L, and a second node between the synchronous rectifiers $Q_3$ and $Q_4$ is connected to a second terminal of the AC voltage $V_{AC}$.

The boost switches $Q_1$ and $Q_2$ of the totem-pole PFC boost converter 210 can be gallium nitride (GaN) transistors, for example, GaN high-electron-mobility transistors (HEMTs) that do not provide any or provide very little reverse recovery loss, or can be other suitable devices, including, for example, silicon carbide metal-oxide-semiconductor field-effect transistors (MOSFETs) and insulated-gate bipolar transistors (IGBTs) with antiparallel connected diodes. The synchronous rectifiers $Q_3$ and $Q_4$ can be MOSFETs, silicon carbide MOSFETs, or other suitable devices. The boost switches $Q_1$ and $Q_2$ can be switched at a higher frequency than the synchronous rectifiers $Q_3$ and $Q_4$. During the positive AC cycle of the AC voltage $V_{AC}$, the synchronous rectifier $Q_3$ is turned on, the synchronous rectifier $Q_4$ is turned off, and the boost switches $Q_1$ and $Q_2$ are complementarily turned on and off to alternatively boost the inductor L and charge the output capacitor $C_{DC}$. During the positive AC cycle of the AC voltage $V_{AC}$, the boost switch $Q_1$ is turned off and the boost switch $Q_2$ is turned on to boost the inductor L, and the boost switch $Q_1$ is turned on and the boost switch $Q_2$ is turned off to charge the capacitor $C_{DC}$. During the negative AC cycle of the AC voltage $V_{AC}$, the synchronous rectifier $Q_4$ is turned on, the synchronous rectifier $Q_3$ is turned off, and the boost switches $Q_1$ and $Q_2$ are complementarily turned on and off to alternatively boost the inductor L and charge the output capacitor $C_{DC}$. During the negative AC cycle of the AC voltage $V_{AC}$, the boost switch $Q_1$ is turned on and the boost switch $Q_2$ is turned off to boost the inductor L, and the boost switch $Q_1$ is turned off and the boost switch $Q_2$ is turned on to charge the capacitor $C_{DC}$.

The integrated auxiliary power supply 120 includes inductor $L_{aux}$, diodes $D_1$ and $D_2$, rectifying capacitors $C_{rec1}$ and $C_{rec2}$, and standby capacitor $C_{stby}$. The inductor $L_{aux}$ is coupled to the boost inductor L, and the inductor $L_{aux}$ defines a secondary winding. The rectifying capacitors $C_{rec1}$ and $C_{rec2}$ are connected in series, and a node between the rectifying capacitors $C_{rec1}$ and $C_{rec2}$ is connected to a first terminal of inductor $L_{aux}$. Diode $D_1$ is connected between the inductor $L_{aux}$ and the rectifying capacitor $C_{rec1}$ such that positive voltage (i.e., the voltage Vin) applied across inductor L charges the rectifying capacitor $C_{rec1}$. Diode $D_2$ is connected between the inductor $L_{aux}$ and the rectifying capacitor $C_{rec2}$ such that negative voltage (i.e., the voltage Vin-Vout) applied across the boost inductor L charges the rectifying capacitor $C_{rec2}$. The diodes $D_1$ and $D_2$ rectify the voltage across the secondary winding (i.e., the inductor $L_{AUX}$). The standby capacitor $C_{stby}$ is connected in parallel with the rectifying capacitors $C_{rec1}$ and $C_{rec2}$, and an output of the integrated auxiliary power supply 120 can be connected across the standby capacitor $C_{stby}$.

Figure 4:
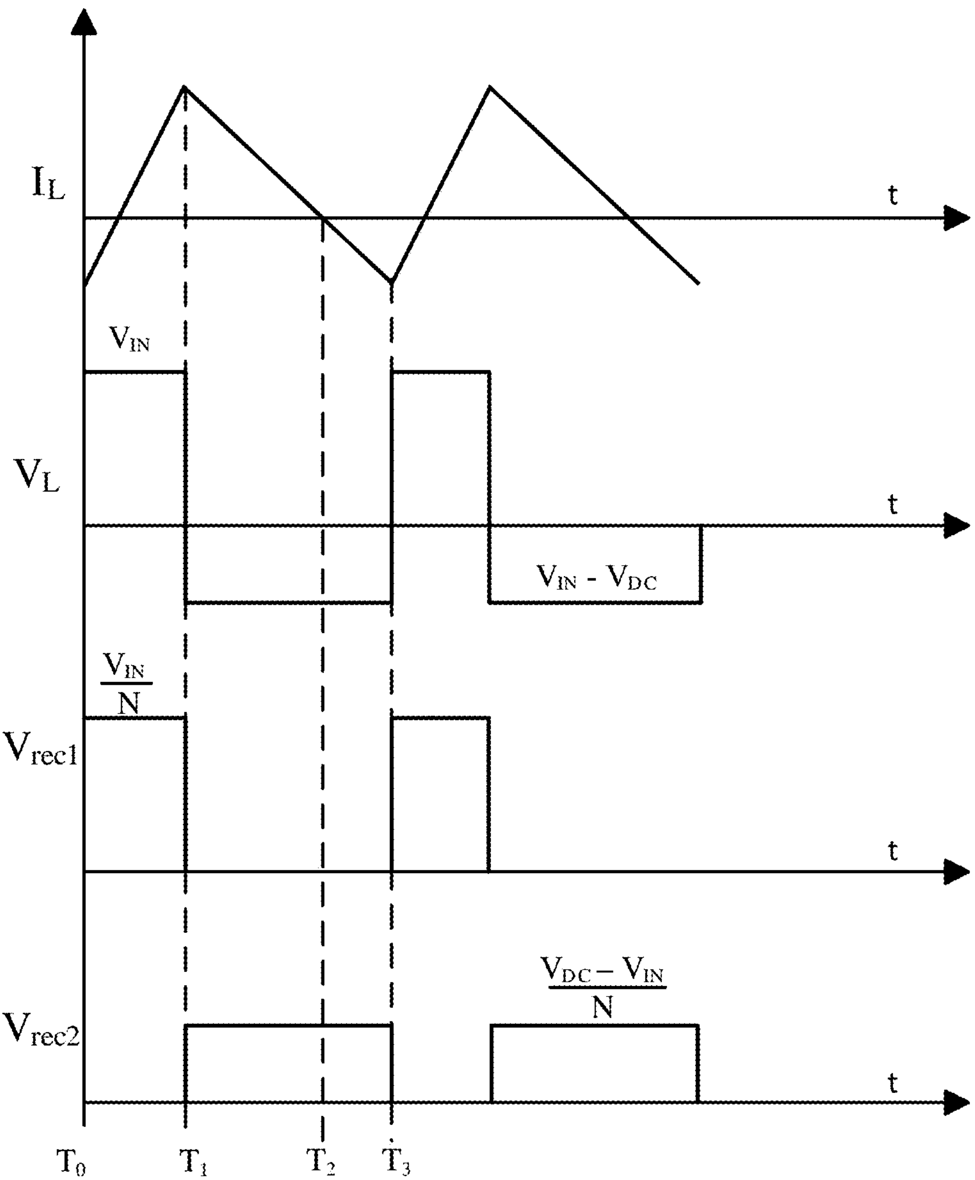
FIG. 4 shows voltage and current waveforms for two switching cycles of the totem-pole PFC boost converter shown in FIG. 3.

FIG. 4 shows voltage waveform $V_L$ and current waveforms $I_L$ of boost inductor L and voltage waveforms $V_{rec1}$ and $V_{rec2}$ of rectifying capacitors $C_{rec1}$ and $C_{rec2}$ shown in FIG. 3 at high-line input and light load for two switching cycles. An example of a high-line input is greater than about 220 V, and an example of light load is less than about 10% of a rated power.

Figure 1:
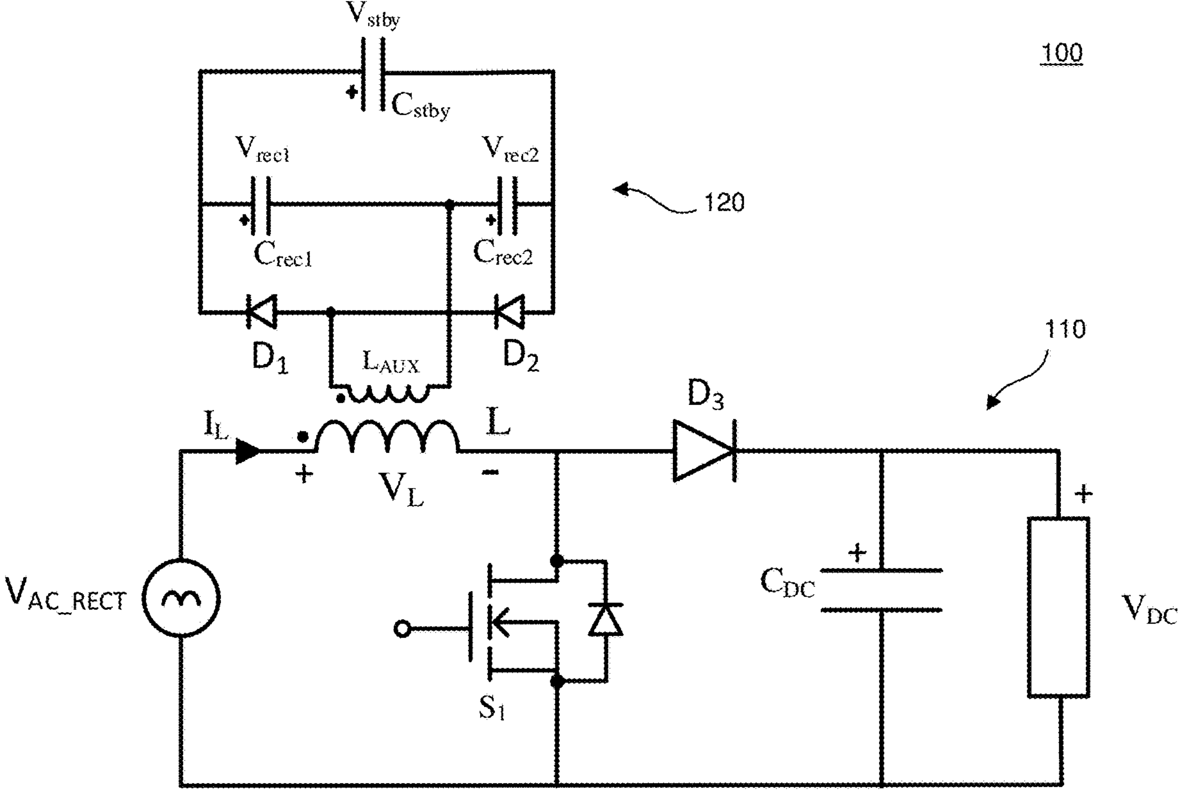
FIG. 1 shows a known unidirectional power factor correction (PFC) boost converter with an integrated auxiliary power supply.
Figure 2:
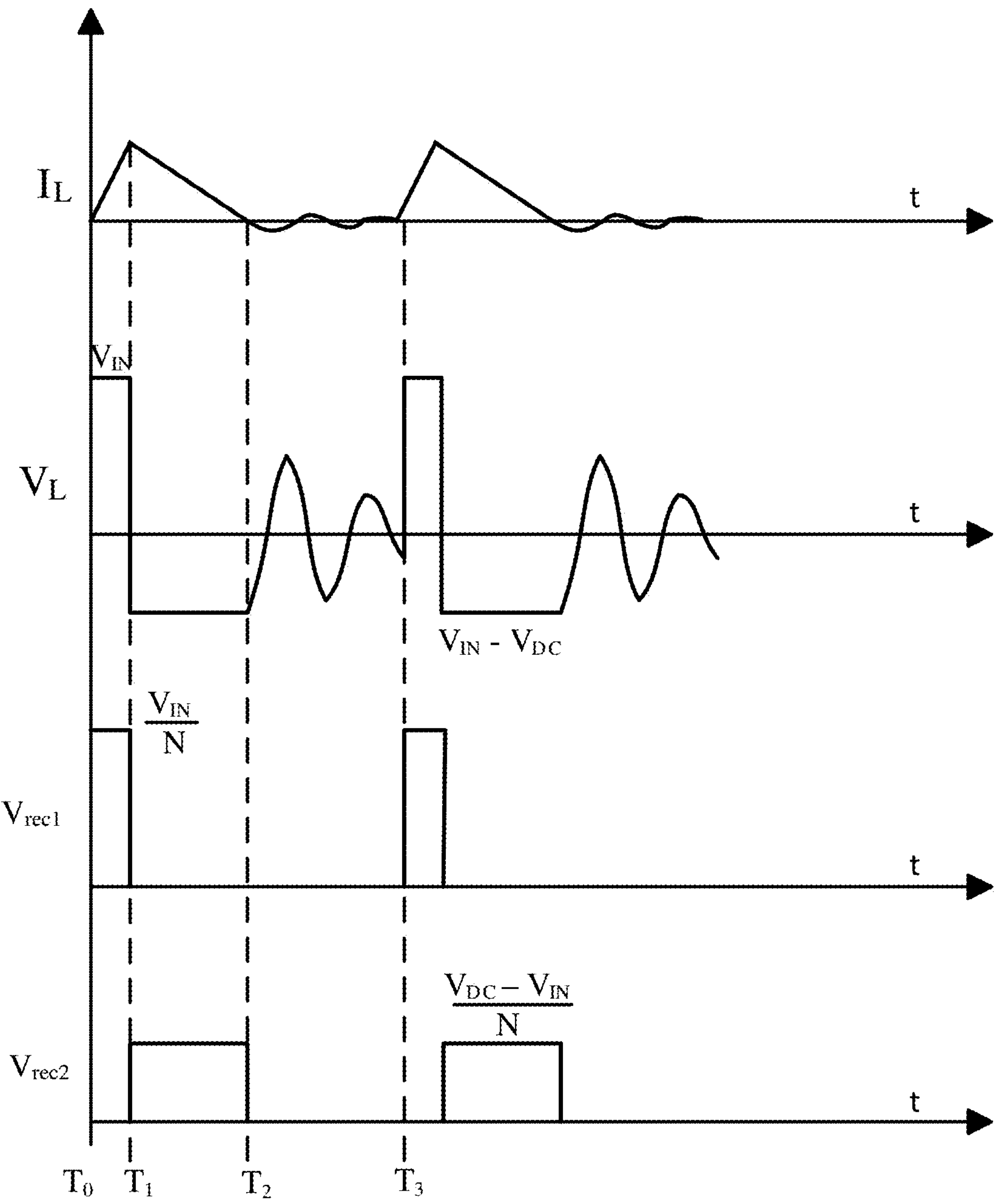
FIG. 2 shows voltage and current waveforms for two switching cycles of the known unidirectional PFC boost converter shown in FIG. 1.

In contrast to the known unidirectional PFC boost converter 110 shown in FIG. 1, the totem-pole PFC boost converter 210 includes synchronous rectifiers $Q_3$ and $Q_4$ in place of diode $D_3$. By including synchronous rectifiers $Q_3$ and $Q_4$ instead of diode $D_3$, current flow through the boost inductor L does not stop upon reaching zero, but instead continues flowing in the opposite direction towards the AC voltage $V_{AC}$, as shown at time T2 in FIG. 4. That is, current can flow bidirectionally in the boost inductor L.

With the totem-pole PFC boost converter 210 shown in FIG. 3, a reflected voltage is provided across inductor $L_{aux}$ over an entire switching cycle, unlike the unidirectional PFC boost converter 110 shown in FIG. 1. Thus, the totem-pole PFC boost converter 210 can provide a sustained power flow between the AC voltage $V_{AC}$ and the auxiliary output for the entirety of each switching cycle of the totem-pole PFC boost converter 210.

The totem-pole PFC boost converter 210 shown in FIG. 3 can provide a longer duty cycle from time T0 to time T1 than a duty cycle of the PFC boost converter 110 shown in FIG. 1 to compensate for the negative current that flows from the DC bulk capacitor. Thus, with the totem-pole PFC boost converter 210 shown in FIG. 3, the integrated auxiliary power supply 120 can operate properly at high line and light output conditions.

According to the operation of the totem-pole PFC boost converter 210 shown in FIG. 3, the inductor current $I_L$ can flow in both directions to provide a switching voltage across the boost inductor L for the entire duration of the pulse width modulation (PWM) period. Thus, the totem-pole PFC boost converter 210 shown in FIG. 3 provides a bi-directional current flow that enhances the performance of the integrated auxiliary power supply 120.

Since the boost switch $Q_1$ remains on when the inductor current $I_L$ reaches zero, the capacitor $C_{DC}$ begins charging the inductor L with negative current through the boost switch $Q_1$. However, the average current of each switching cycle is the component that results in power transfer from the AC side to the DC side of the totem-pole PFC boost converter 210. In other words, whether conduction of the boost switch $Q_1$ stops when the inductor current $I_L$ reaches zero or continues, the net average current of the switching cycle remains the same. Therefore, by allowing negative current to flow through the boost switch $Q_1$, more positive current is required in the charging period, when the boost switch $Q_2$ is on and the boost switch $Q_1$ is off, to maintain the average current at the same level as in the case when the boost switch $Q_1$ ceases conduction when $I_L$ reaches zero (similar to the unidirectional PFC boost converter 110 shown in FIG. 1 stopping conduction due to the diode $D_3$). Thus, the totem-pole PFC boost converter 210 provides longer duty cycles when compared with the PFC boost converter 110, which means that very narrow pulses are also avoided. Narrow pulses can interrupt power delivery to the voltage $V_{stby}$ as soon as a volt-see balance of the inductor L is completed, after which no power is transferred to the voltage $V_{stby}$ due to resonance between the inductor L and any parasitic capacitances, for example, junction capacitor (s), where energy is only exchanged between the reactive elements (inductors and capacitors).

Figure 5:
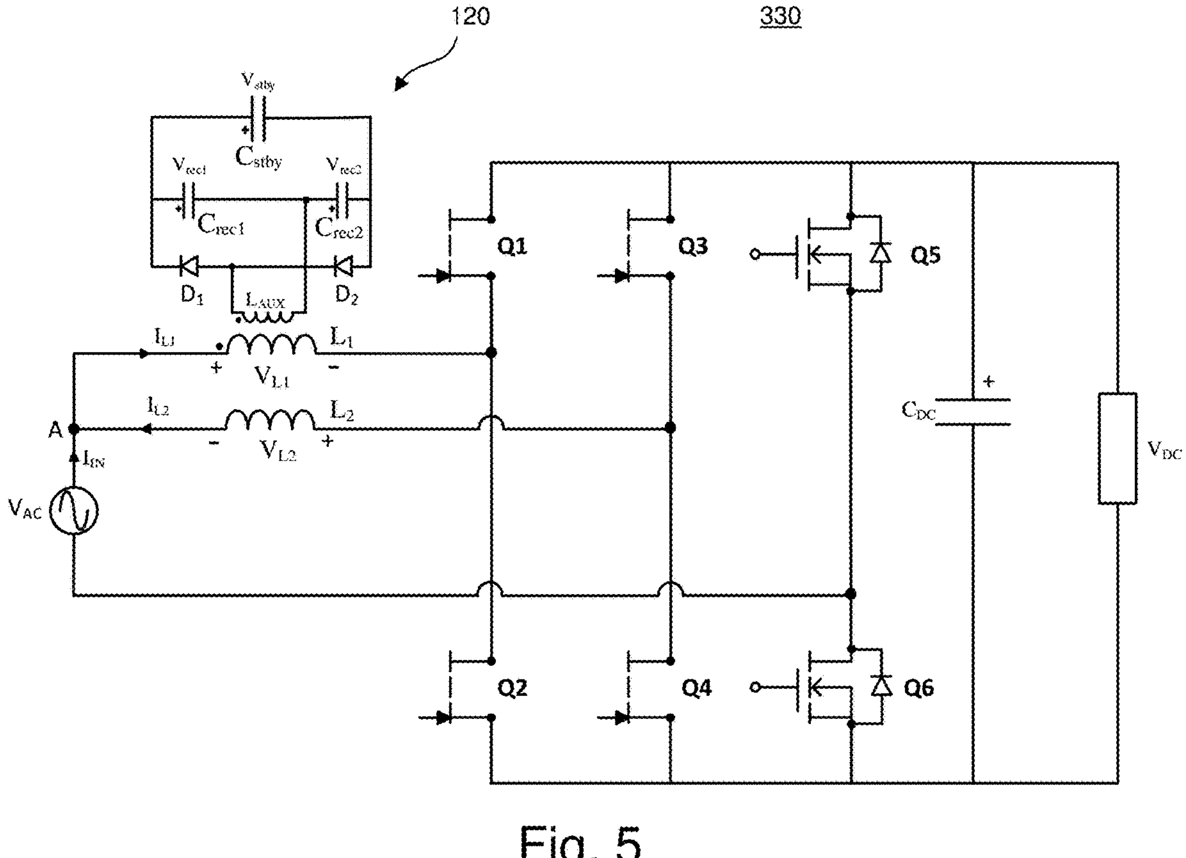
FIG. 5 shows a two-phase interleaved totem-pole PFC boost converter.

FIG. 5 shows a two-phase interleaved totem-pole converter 330 according to a second preferred embodiment of the present invention. The two-phase interleaved totem-pole converter 330 shown in FIG. 5 can provide increased auxiliary output power compared with the PFC boost converter 110 shown in FIG. 1, but with much less ripple in the input current and without the need of much negative current in the boost inductor, in contrast to the totem-pole PFC boost converter 210 shown in FIG. 3.

The two-phase totem-pole PFC boost converter 330 includes an AC voltage $V_{AC}$ as an input voltage connected to a first phase with a first inductor $L_1$ (also referred to as the first boost inductor) and connected to a second phase with second inductor $L_2$ (also referred to as the second boost inductor), an integrated auxiliary power supply 120 coupled to the first inductor $L_1$, two series-connected synchronous rectifiers $Q_5$ and $Q_6$ connected to the first and second phases, and an output capacitor $C_{DC}$ connected in parallel with the synchronous rectifiers $Q_5$ and $Q_6$. The first phase also includes two series-connected boost switches $Q_1$ and $Q_2$ connected to the first inductor $L_1$, and the second phase also includes two series-connected boost switches $Q_3$ and $Q_4$ connected to the second inductor $L_2$. The two series-connected synchronous rectifiers $Q_5$ and $Q_6$ are connected in parallel with the boost switches $Q_1$ and $Q_2$ and in parallel with the boost switches $Q_3$ and $Q_4$. The output capacitor $C_{DC}$ can be connected to a load, shown as DC voltage $V_{DC}$ as the output voltage. A first node between the boost switches $Q_1$ and $Q_2$ is connected to a first terminal of the AC voltage $V_{AC}$ via the first inductor $L_1$, a second node between the boost switches $Q_3$ and $Q_4$ is connected to the first terminal of the AC voltage $V_{AC}$ via the second inductor $L_2$, and a third node between the synchronous rectifiers $Q_5$ and $Q_6$ is connected to a second terminal of the AC voltage $V_{AC}$.

The boost switches $Q_1$, $Q_2$, $Q_3$, and $Q_4$ of the totem-pole PFC boost converter 20 can be gallium nitride (GaN) transistors, for example, GaN high-electron-mobility transistors (HEMTs) or can be other suitable devices, including, for example, silicon carbide metal-oxide-semiconductor field-effect transistors (MOSFETs) and insulated-gate bipolar transistors (IGBTs) with anti-parallel connected diodes. The synchronous rectifiers $Q_5$ and $Q_6$ can be MOSFETs, silicon carbide MOSFETs, or other suitable devices. The boost switches $Q_1$, $Q_2$, $Q_3$, and $Q_4$ can be switched at a higher frequency than the synchronous rectifiers $Q_5$ and $Q_6$. The boost switches $Q_1$, $Q_2$, $Q_3$, and $Q_4$ and the synchronous rectifiers $Q_5$ and $Q_6$ can be operated in a similar manner as discussed above, but the switching of the first and second phases can be out of phase with each other. For example, the switching of boost switches $Q_1$ and $Q_2$ and the switching of boost switches $Q_3$ and $Q_4$ can be out phase by 180° with each other.

The integrated auxiliary power supply 120 used in the two-phase interleaved totem-pole converter 330 of FIG. 5 can be the same as the integrated auxiliary power supply 120 discussed above with respect to FIG. 3.

Each phase of the two-phase interleaved totem-pole converter 330 can be operated as a boost converter or a buck converter. At light load (for example, less than about 10% of a rated load), the first phase that is coupled to the integrated auxiliary power supply 120 can be operated as a boost converter. Therefore, the second phase can be operated as a buck converter to provide a circulating current to the boost inductor $L_1$ of the first phase operating as a boost converter. FIG. 5 shows an example of the two-phase interleaved totem-pole PFC converter 330 operating when a positive phase is provided by the AC voltage $V_{AC}$. During the positive phase of the AC voltage $V_{AC}$, inductor $L_1$ operates as a main boost inductor and supplies current to DC voltage $V_{DC}$ plus the circulating current. Accordingly, more current flows through the inductor $L_1$, which prevents the inductor current from becoming discontinuous. Therefore, power flow between the AC voltage $V_{AC}$ and the auxiliary output is not interrupted. During a negative phase of the AC voltage $V_{AC}$, the current directions and voltage polarities described above are reversed. That is, the operation of the two-phase interleaved totem-pole PFC boost converter 330 during the negative phase is symmetric to the operation during the positive phase.

The buck operation of the two-phase interleaved totem-pole PFC converter 330 has a complementary duty cycle with respect to the boost operation to maintain the same input and output voltage levels. The main switch in the boost phase is the opposite of the main switch in the buck phase. For example, if the switch $Q_2$ is the main switch in the boost phase, then the switch $Q_3$ is the main switch in the buck phase. Accordingly, switches $Q_1$ to $Q_4$ can receive the same control signals as a typical 2-phase interleaved totem-pole PFC. To transition one phase from the boost operation to buck operation, the one of the switches $Q_1$ to $Q_4$ that operates as a free-wheeling switch is disabled for a predetermined number of switching cycles to build up the negative current in the inductor L, and then this switch can be re-activated to reduce conduction losses.

As discussed above, FIG. 5 shows an example of the two-phase interleaved totem-pole PFC converter 330 operating when a positive phase is provided by the AC voltage $V_{AC}$. Accordingly, the current $I_{L1}$ through the inductor $L_1$ is the boost current, while the current $I_{L2}$ through the inductor $L_2$ is the circulating current generated by the other phase of the AC voltage $V_{AC}$. The switches $Q_3$ and $Q_4$ of the second phase reverse their roles, and switch $Q_3$ operates as the main switch and switch $Q_4$ operates as a free-wheeling switch. FIG. 5 shows the directions of the currents $I_{L1}$, $I_{L2}$, and $I_{IN}$ during the positive phase of the AC voltage $V_{AC}$. By applying Kirchhoff's Current Law at node A, the boost current $I_{L1}$ of the inductor $L_1$ is the sum of the current $I_{IN}$ from the AC voltage $V_{AC}$ and the circulating current $I_{L2}$. Thus, instead of the current $I_{L1}$ being half of the current $I_{IN}$, the current $I_{L1}$ is now the sum of the currents $I_{IN}$ and $I_{L2}$.

Figure 6:
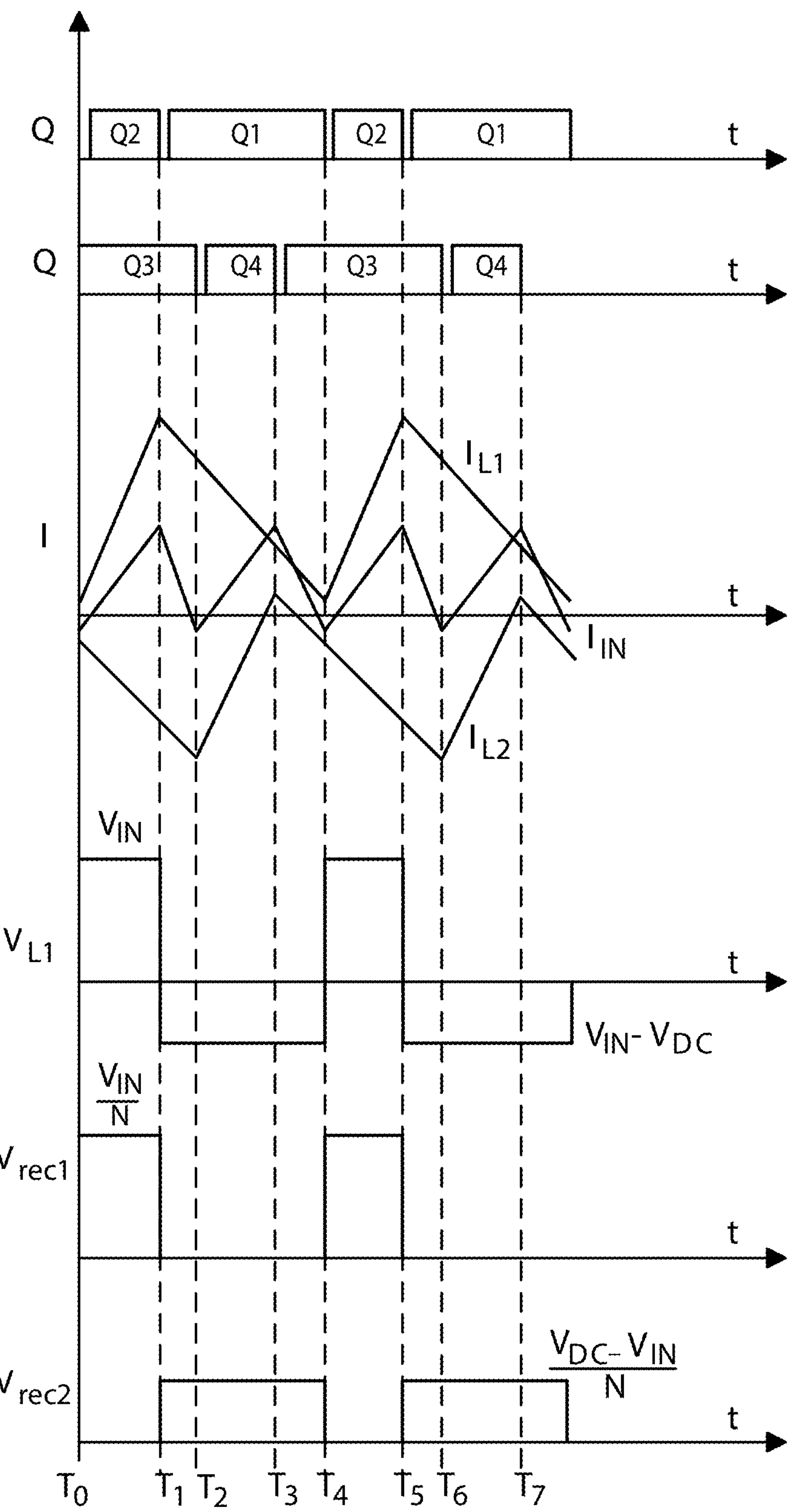
FIG. 6 shows inductor switching timing and voltage and current waveforms of two switching cycles of the two-phase interleaved totem-pole PFC boost converter shown in FIG. 5.

FIG. 6 shows inductor switching timing and voltage and inductor current waveforms of two switching cycles of the two-phase interleaved totem-pole PFC boost converter 330 shown in FIG. 5. Assuming the direction of the inductor current in the inductor $I_{L1}$ is positive, the current flow described above for the two-phase interleaved totem-pole PFC boost converter 330 is illustrated in FIG. 6. The current level in the inductor $I_{L1}$, which operates as the boost inductor, can be increased, which extends the power delivery duration from the AC voltage $V_{AC}$ to the auxiliary output and reduces a dependence on auxiliary capacitors, including standby capacitor $C_{stby}$ and rectifying capacitors $C_{rec1}$ and $C_{rec2}$. By interleaving the two phases, the ripple of the input current can be reduced, and the frequency can be doubled, as shown in FIG. 6, and thus the ripple component in the input current is more easily filtered. During a negative phase of the AC voltage $V_{AC}$, the current directions and voltage polarities described above are reversed. That is, the operation of the two-phase interleaved totem-pole PFC boost converter 330 during the negative phase is symmetric to the operation during the positive phase.

Figure 7:
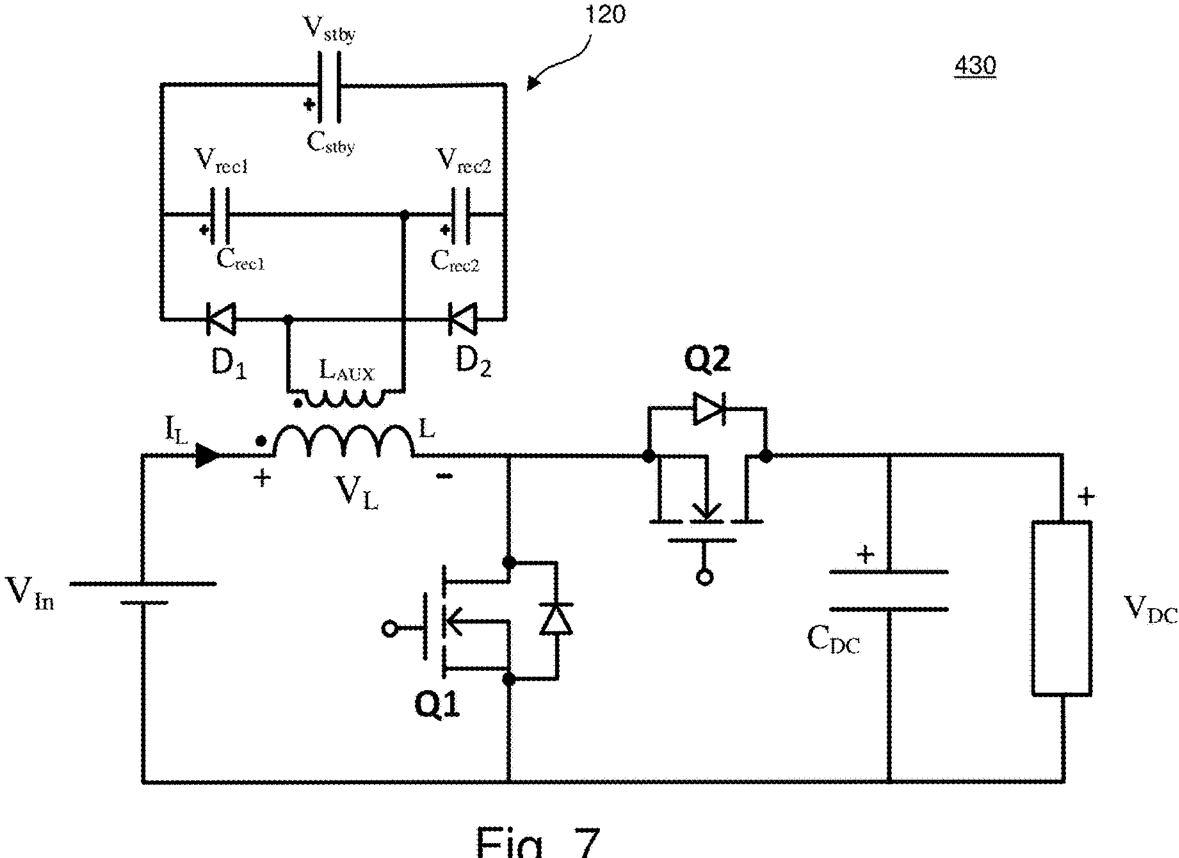
FIG. 7 shows a synchronous boost converter in which a diode is replaced by an active switch.

FIG. 7 shows a synchronous boost converter 430 according to a third preferred embodiment of the present invention, in which diode D3 of FIG. 1 is replaced by synchronous rectifier Q2, which is connected between the inductor L and an output terminal and the capacitor $C_{DC}$. The inductor L is connected between a first terminal of the input voltage Vin and the synchronous rectifier $Q_2$. The boost switch $Q_1$, which can also be referred to as a power switch, is connected to the inductor L and a second terminal of the input voltage. In particular, when reverse recovery losses are not a design concern, the synchronous rectifier $Q_2$ can be used instead of a diode. The synchronous rectifier Q2 can provide negative current flow through the inductor L. The integrated auxiliary power supply 120 is coupled to the inductor L in a similar manner as discussed above with respect to the first and second preferred embodiments of the present invention. Accordingly, the integrated auxiliary power supply 120 described above can provide a reliable auxiliary output during all input voltage and load conditions, including high-line and light-load conditions.

Figure 8:
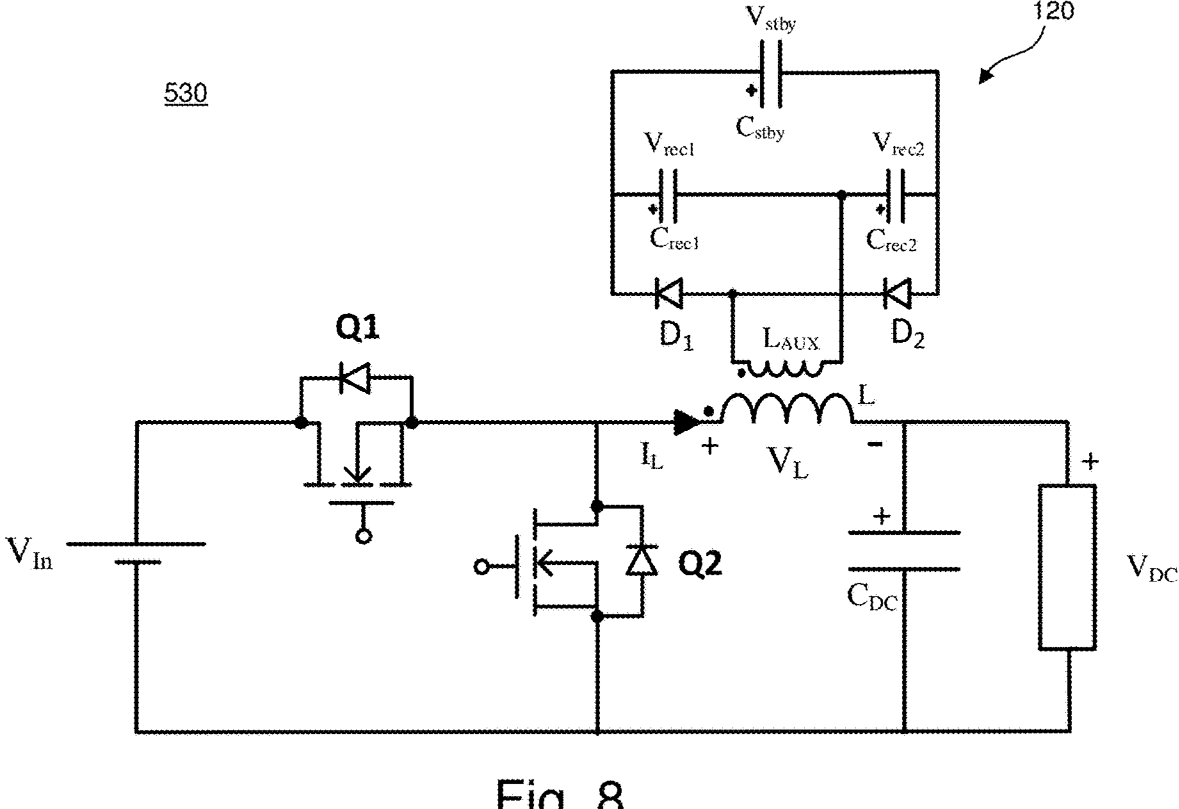
FIG. 8 shows a synchronous buck converter.

In automotive and industrial applications, a single-stage non-isolated synchronous buck converter, an example of which is shown FIG. 8 as the fourth preferred embodiment of the present invention, can be used. The integrated auxiliary power supply 120 can be used with negative current flow in a similar manner as the first, second, third preferred embodiments of the present invention described above. The synchronous buck converter 530 includes a buck switch Q1, which can also be referred to as a power switch, connected between a first terminal of the input voltage Vin and the inductor L and includes a synchronous rectifier Q2 connected between a second terminal of the input voltage and a node between the buck switch Q1 and the inductor L. The inductor L is also connected to an output terminal and to the capacitor $C_{DC}$. The integrated auxiliary power supply 120 is coupled to the inductor L in a similar manner as discussed above with respect to the first, second, and third preferred embodiments of the present invention. When current in the inductor L becomes discontinuous for the majority of a PWM cycle, the synchronous rectifier Q2 of FIG. 8 can conduct negative current, which allows the integrated auxiliary power supply 120 to provide a stable auxiliary output voltage.

The synchronous boost converter 430 shown in FIG. 7 can also be implemented as an interleaved totem-pole PFC boost converter, for example, as described above with respect to FIG. 5.

Figure 9:
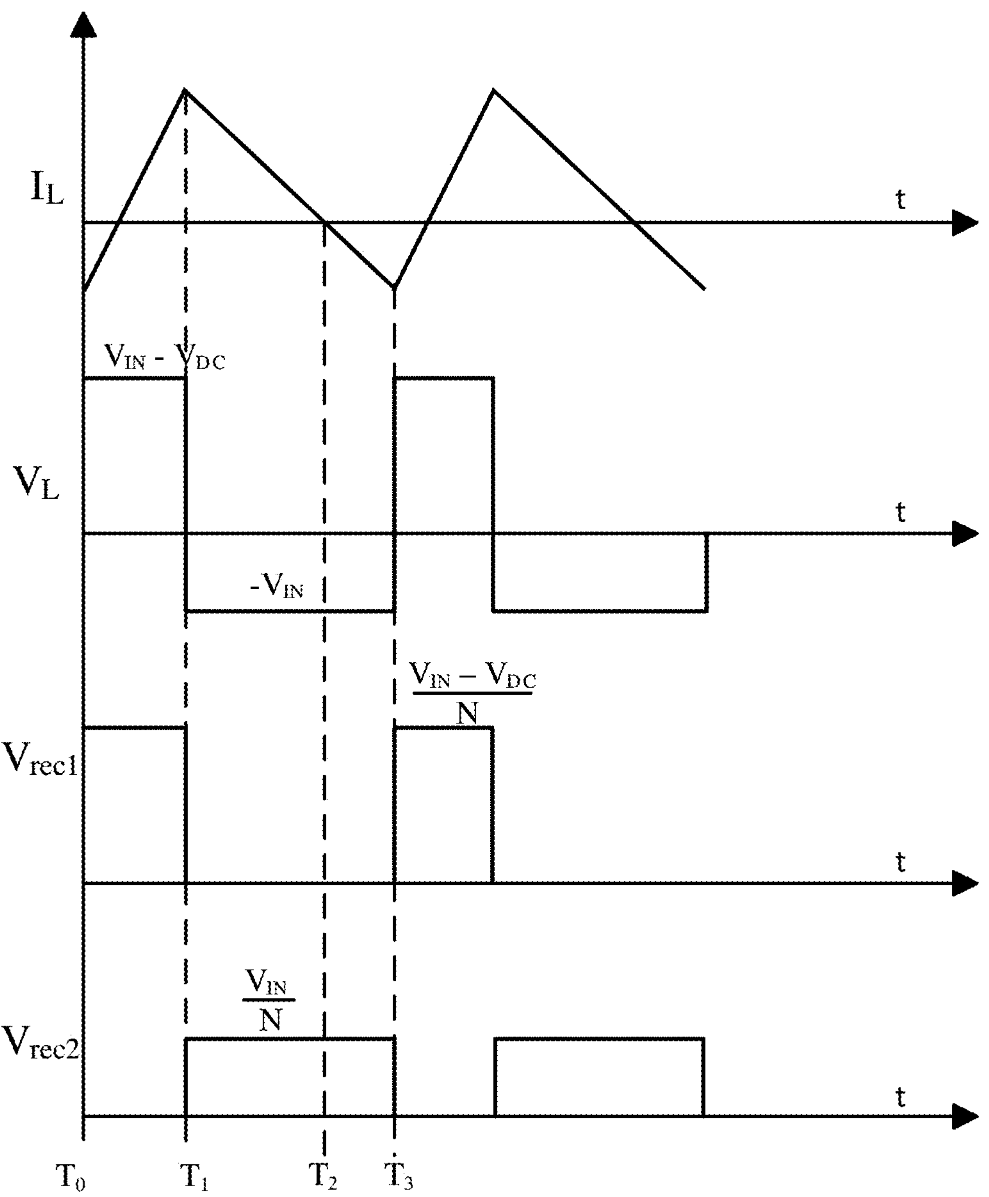
FIG. 9 shows voltage and current waveforms for two switching cycles of the synchronous buck converter shown in FIG. 8.

FIG. 9 shows voltage and current waveforms for two switching cycles of the synchronous buck converter 530 shown in FIG. 8. Similar to the totem-pole PFC boost converter 210, the two-phase interleaved totem-pole converter 330, and the synchronous boost converter 430 described above, at time T2, the switch Q2 of the synchronous buck converter 530 remains on to provide negative current flow. In the case of buck operation, the inductor L of the synchronous buck converter 530 is always connected to the DC voltage $V_{DC}$, unlike boost operation where the inductor L is always connected to the input voltage $V_{IN}$. Accordingly, when switch Q2 is on and the inductor L is detached from the input voltage $V_{IN}$, the output capacitor $C_{DC}$ of the synchronous buck converter 530 provides power to the bias output. Therefore, the capacitor $C_{DC}$ is sized to provide sufficient power to the auxiliary output voltage when the synchronous rectifier Q2 is on and the inductor L is detached from the input voltage $V_{IN}$.

The synchronous boost converter 430 shown in FIG. 9 can also be implemented as an interleaved totem-pole PFC boost converter, for example, as described above with respect to FIG. 5.

Although the integrated auxiliary power supply 120 is described with respect to a single secondary inductor $L_{AUX}$, the integrated auxiliary power supply 120 may include one or more additional secondary inductors coupled to the boost inductor L, and the one or more additional secondary inductors may provide voltages that are different from a voltage provided by the secondary inductor ($L_{AUX}$).

For example, the overall power supply can include two stages. A first stage can provide AC-DC conversion with power factor correction, in which the input voltage can be boosted to about 400 V. A second stage can provide DC-DC conversion, for example, by an LLC converter, which can provide a regulated output voltage of about 12 V.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A converter comprising:

a first inductor;

a first power switch connected to the first inductor; and an auxiliary power supply coupled to the first inductor to provide an auxiliary voltage from bi-directional current flow in the first inductor; wherein in response to the bi-directional current flowing in the first inductor going from a positive current to a negative current, the first power switch remains on to provide power to the auxiliary power supply.

2. The converter of claim 1, further comprising an output capacitor, wherein the negative current is provided by the output capacitor.

3. The converter of claim 2, wherein there are no discrete diodes between the first inductor and the output capacitor.

4. The converter of claim 1, wherein the negative current flows in the first inductor under high-line and light-load conditions.

5. The converter of claim 1, wherein:
the auxiliary power supply includes a second inductor coupled to the first inductor to provide the auxiliary voltage, and
the auxiliary power supply includes a third inductor coupled to the first inductor to provide a second auxiliary voltage.

6. The converter of claim 1, further comprising:
a second power switch connected in series with the first power switch; wherein
a first node between the first and the second power switches is connected to the first inductor; and
the converter defines a totem-pole power-factor-correction (PFC) boost converter.

7. The converter of claim 6, further comprising first and second synchronous rectifiers connected in series with each other and connected in parallel with the first and the second power switches.

8. The converter of claim 7, wherein the first and the second synchronous rectifiers are field-effect transistors.

9. The converter of claim 7, wherein the output capacitor is connected in parallel with the first and the second synchronous rectifiers.

10. The converter of claim 1, wherein the first and the second power switches are GaN high-electron-mobility transistors, silicon carbide metal-oxide-semiconductor field-effect transistors, or insulated-gate bipolar transistors with anti-parallel diodes.

11. The converter of claim 1, further comprising a synchronous rectifier connected between the first inductor and an output terminal of the converter; wherein
the converter defines a synchronous boost converter.

12. The converter of claim 1, further comprising a synchronous rectifier; wherein
the first power switch is connected between a first input terminal of the converter and the first inductor;
the synchronous rectifier is connected between a second input terminal of the converter and a node between the first power switch and the first inductor; and
the converter defines a synchronous buck converter.

13. The converter of claim 1, wherein:
the auxiliary power supply includes:
a second inductor coupled to the first inductor;
a first capacitor and a second capacitor connected in series with each other such that a node between the first and the second capacitors is connected to a first terminal of the second inductor; and
a first diode and a second diode connected in series with each other such that a node between the first and second diodes is connected to a second terminal of the second inductor; and
the first and second capacitors are collectively connected in parallel with the first and second diodes.

14. A totem-pole power-factor-correction (PFC) boost converter comprising:
a first phase including a first boost inductor;
a second phase including a second boost inductor; and
an auxiliary power supply coupled to the first boost inductor; wherein
the first phase is operated as a boost converter to provide a DC output voltage; and
the second phase is operated as a buck converter to provide a circulating current to the first boost inductor.

15. The totem-pole PFC boost converter of claim 14, wherein the second phase is operated as the buck converter to provide the circulating current to the first boost inductor only under light-load conditions.

16. The totem-pole PFC boost converter of claim 14, wherein
the first phase includes first and second boost switches connected in series;
a first node between the first and the second boost switches is connected to the first boost inductor;
the second phase includes third and fourth boost switches connected in series;
a second node between the third and the fourth boost switches is connected to the second boost inductor.

17. The totem-pole PFC boost converter of claim 16, further comprising first and second synchronous rectifiers connected in series with each other, connected in parallel with the first and the second boost switches, and connected in parallel with the third and the fourth boost switches.

18. The totem-pole PFC boost converter of claim 17, wherein the first and the second synchronous rectifiers are field-effect transistors.

19. The totem-pole PFC boost converter of claim 17, further comprising an output capacitor connected in parallel with the first and the second synchronous rectifiers.

20. The totem-pole PFC boost converter of claim 16, wherein the first, the second, the third, and the fourth boost switches are GaN high-electron-mobility transistors, silicon carbide metal-oxide-semiconductor field-effect transistors, and insulated-gate bipolar transistors with anti-parallel diodes.

21. The totem-pole PFC boost converter of claim 14, wherein:
the auxiliary power supply includes:
a third inductor coupled to the first boost inductor;
a first capacitor and a second capacitor connected in series with each other such that a node between the first and the second rectifying capacitors is connected to a first terminal of the third inductor;
a first diode and a second diode connected in series with each other such that a node between the first and the second diodes is connected to a second terminal of the third inductor; and
a standby capacitor connected in parallel with the first and the second capacitors; and
the first and second capacitors are collectively connected in parallel with the first and second diodes.

* * * * *